A. CROWE & J. E. KINZEL.
TIRE FOR VEHICLES.
APPLICATION FILED APR. 2, 1909.
974,124.
Patented Nov. 1, 1910.
2 SHEETS—SHEET 2.
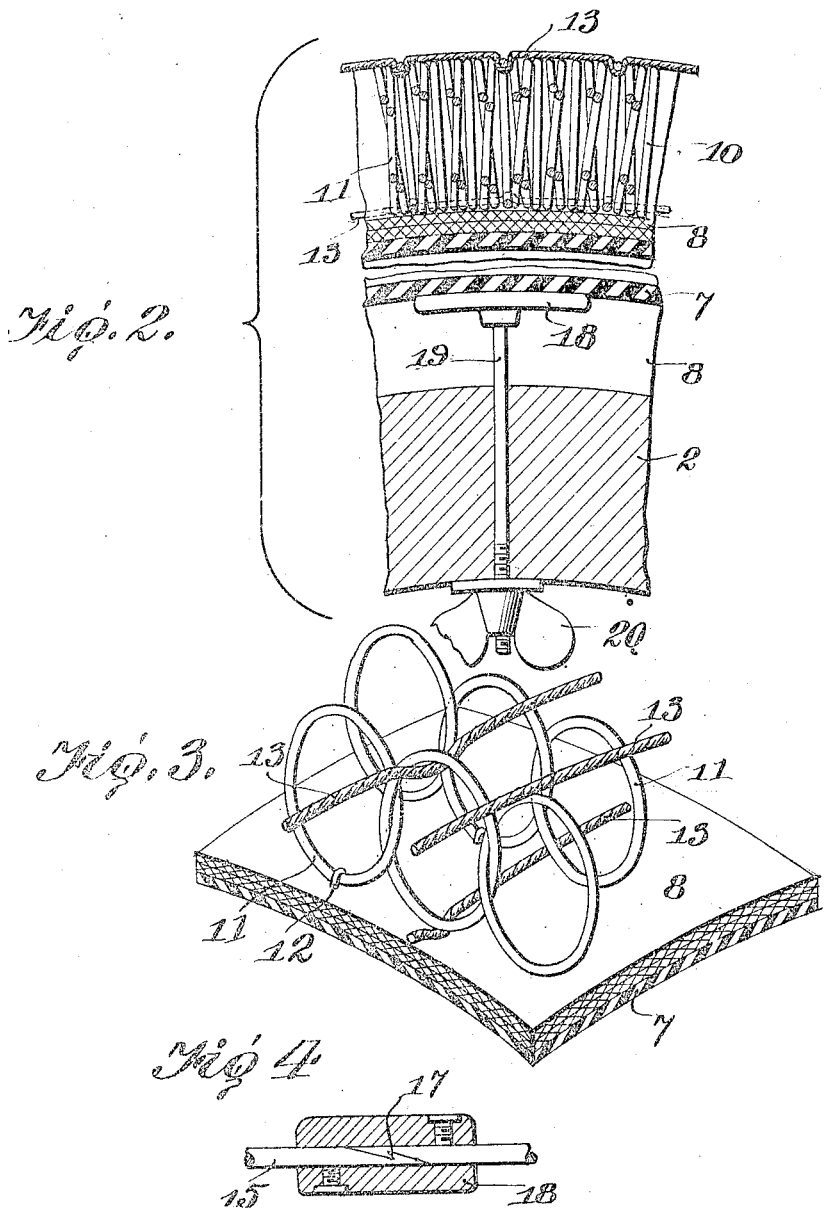

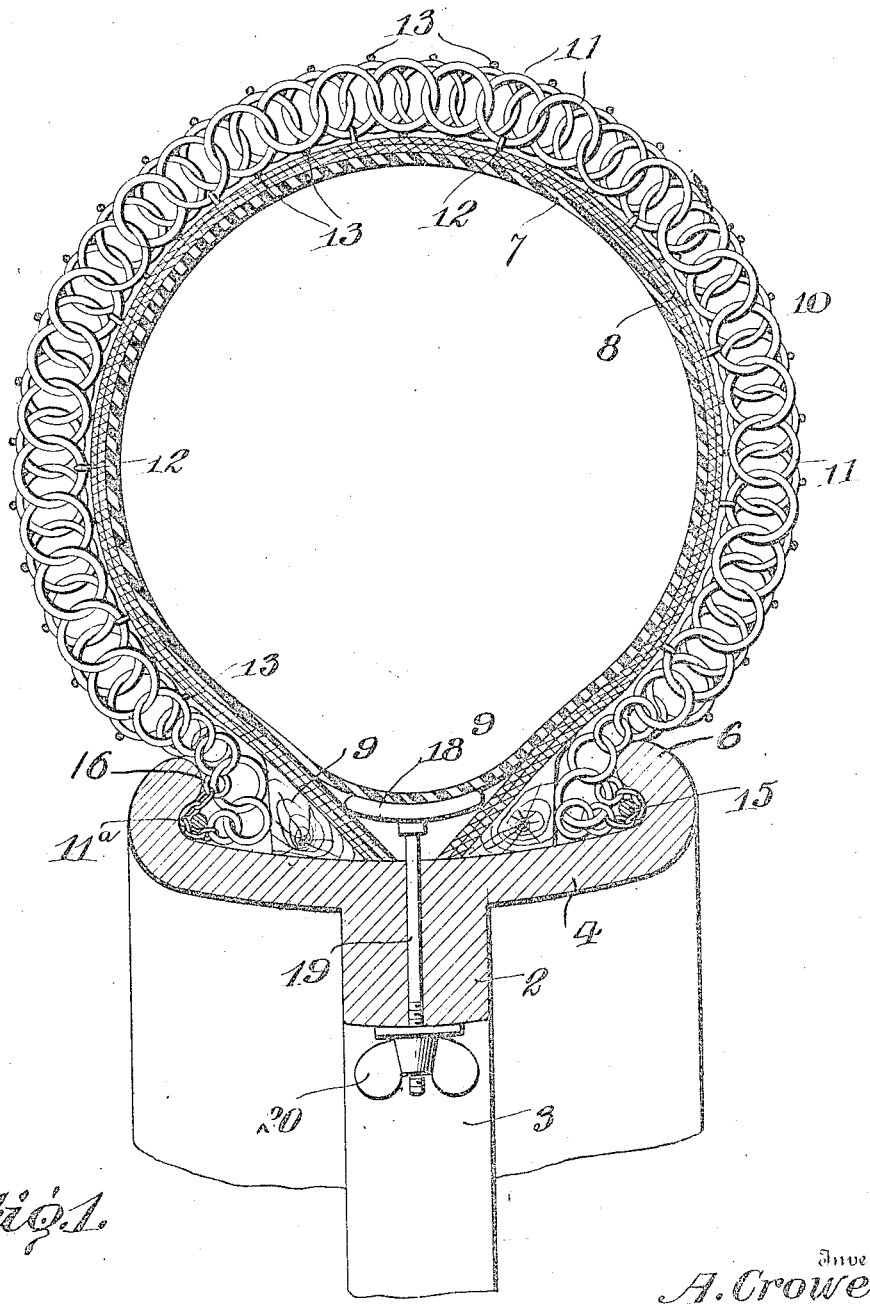

UNITED STATES PATENT OFFICE.

ALEXANDER CROWE AND JOHN E. KINZEL, OF YOUNGSTOWN, OHIO.

TIRE FOR VEHICLES.

974,124.      Specification of Letters Patent.      Patented Nov. 1, 1910.

Application filed April 2, 1909. Serial No. 487,388.

*To all whom it may concern:*

Be it known that we, ALEXANDER CROWE and JOHN E. KINZEL, citizens of the United States, residing at Youngstown, in the county of Mahoning and State of Ohio, have invented certain new and useful Improvements in Tires for Vehicles, of which the following is a specification.

Our invention relates to tires for vehicles, and particularly to armored pneumatic tires, the object of the invention being to provide a tire which shall be unpuncturable, non-rustable and flexible, whose strength shall be such that it will be entirely free from explosion or bursting due to overheating or great peripheral velocity, skidding being prevented by reason of the ribbed exterior face of the tire due to its peculiar construction of a multiplcity of rings.

The invention consists, broadly, of a tire having a covering face composed of closely woven circular shaped metallic rings; the rings forming the fabric of the tire being linked to each other, allowing for expansion and contraction and giving the greatest strength with the least area. The whole fabric of the tire is bound closely in position by lengths of wire passing around the tire longitudinally thereof and interwoven with the rings, thereby holding the tire in place and making of the fabric a solid metal structure. This metal fabric is supported on a suitable foundation or lining of textile fabric, preferably canvas which is held upon the outer surface of an interior pneumatic tire of rubber, this outer canvas covering or lining protecting the inner tube from contact with the metallic rings and consequent abrasion, and preventing the passage of water or dust through to the interior tire.

For a full understanding of the invention and the merits thereof, and to acquire a knowledge of the details of construction, reference is to be had to the following description and accompanying drawings, in which:

Figure 1 is a transverse section through the tire and through a part of the clencher rim; Fig. 2 is a fragmentary longitudinal section. Fig. 3 is a diagrammatic perspective view of a fragment of the tire; and, Fig. 4 is a detail section of the means for clamping the ends of the main supporting bars.

Corresponding and like parts are referred to in the following description and indicated in all the views of the drawings by the same reference characters.

Referring to the drawings, 2 designates a felly of any usual or desired character, and 3 one of the spokes of the wheel.

4 designates a clencher rim having the outwardly turned side edges common to clencher rims.

7 designates an inner tire of rubber or other flexible material such as is commonly used in pneumatic tires.

Our particular invention comprises a lining 8 composed of several thickness of canvas or like material which has been, by any suitable process rendered water-proof. The edges of this canvas lining are attached to annular wooden strips 9, triangular in cross section and reversely placed to each other so that the inclined inside faces of the strips shall be opposed to each other, as shown in the sectional view. The fabric of the lining is to be attached to these wooden strips in any suitable manner, as by screws.

Supported upon the outer face of the lining 8, is a webbing or fabric 10 composed of interlocked rings 11, the plane of the rings being perpendicular to the face of the lining and transverse to the axis of the tire. This fabric is composed of a multiplicity of series of metal rings 11, these rings being formed of resilient material, each series of rings extending from one edge of the lining to the other, and therefore extending around the tire transversely to the axis thereof from one edge of the clencher rim to the other. Each ring is interlinked with the longitudinally adjacent rings, the series of rings being held to the lining 8 by staples or other like devices 12. Each series of rings is located immediately adjacent to the next series on each side, so that the rings of all the series are in contact with each other, so that thus all the rings are held in an outstanding relation, the plane of the rings being perpendicular to the surface of the tire. It will be seen from Fig. 1 that the rings of each series are not in alinement with the rings of the next adjacent series, but that they bear a staggered relation to the next adjacent series on both sides. This distributes the pressure on the tire over a considerable surface of the inner lining and prevents the pressure from being distributed in a longitudinal line along the tire. It also aids in forming an interlocking fabric. The separate series of rings are interlocked with each other by interweaving therewith longitudinal strands of wire 13. Each of these strands, as will be seen from Fig. 2, extends along the outer and inner face of the rings, and at intervals is interwoven under a ring of one of the series. In order that the rings of the series shall not be separated too greatly, it is best that the strands 13 shall pass over the outer face of a number of rings and then beneath one or more of the rings, then again over the outer surface of a number of rings, and so on. We do not wish, however, to be limited to the manner in which the longitudinal strands are interwoven with the rings. There may be as many of these longitudinal strands as desired, and we have shown in the illustration as many longitudinal strands as there are rings in each series.

In order to attach the exterior tire to the felly and to the clencher rim, we form the inner margins of the tire of relatively small rings 11ª, and leave these margins free from attachment to the inner lining. These marginal rings 11ª extend downward on the outer faces of the strips 9 and are turned over outwardly and bent inwardly around opposed annular rods 15. This turned-over portion of the fabric is connected to the main body of the metallic fabric by small rings 16 plainly shown in Fig. 1. Thus, the rods 15 are inclosed in a hem, as it may be called, formed upon the opposed inner edges of the tire. The ends of the rods 15 are coupled together as shown in Fig. 4. That is, the ends are oppositely beveled so as to fit against each other and form mutual barbs 17 so as to be interlocked. A sleeve 18 is fitted over these joined ends of the rods 15 and is held in place by any suitable means, as for instance, by a screw. It will be seen that the inner edges of the fabric where it is turned over the rods 15 forms an annular rib-like portion on either side of the inner edge of the tire, which ribs are adapted to be forced into locking engagement with the inwardly turned ends 6 of the clencher rim, as shown in Fig. 1, when the inner edges of the lining 8 are forced outward. To accomplish the wedging outward of the strips 9 and the fabric, we provide wedge plates 18 which are located beneath the interior pneumatic tire 7 and have rods 19 projecting therefrom that extend out through the rim 5 and through the felly 2. These rods, at their ends, are screw-threaded and provided with nuts 20. By turning the wing nuts, it will be obvious that the wedge plates 18 will be drawn inwardly, thus contacting with the inner surface of the marginal edges of the canvas 8 and forcing the strips 9 outward, thereby forcing the lower ribbed edges of the metallic fabric into interlocked relation with the inwardly turned edges of the clencher rim, as before described. While we deem this manner of attaching the outer tire to the rim preferable, we do not wish to be limited thereto, as it is obvious that we might modify this construction in many respects without departing from the spirit of the invention, and for the reason that our invention lies broadly not so much in the attaching means, as in a tire consisting of a multiplicity of interlinked outwardly extending rings which, through their close relation, form an armor for the interior tire, and which, because of their resiliency and their being interlinked with each other, provide a yielding and resilient metallic surface.

It will be seen that the armored face of the tire being formed of interlinked rings, a large space is left for the circulation of air around the rings, and that thus any moisture that might otherwise accumulate on the tire, will be readily evaporated. Our construction, therefore, will not retain moisture in contact with the inner canvas lining or between the rings. Neither will it act to retain dust, for the reason that the continuous flexing of the rings will cause them to shift upon each other to some extent and slide open, thus permitting small particles of earth or other material to be granulated and to fall out between the rings.

One of the principal advantages of the invention lies in the fact that besides entirely protecting the interior pneumatic tire from any chance of injury and inclosing it in a metallic fabric that will absolutely prevent all chance of bursting, it also provides a tire surface which, being roughened or ribbed, will prevent skidding. This is not only prevented by the roughened surface given by the multiplicity of rings, but also by the longitudinal interwoven strands of wire, which form longitudinal ribs or grooves on the outer surface of the tire and prevent all sidewise movement of the wheel.

Having thus described the invention, what is claimed as new is:—

1. A vehicle tire having an outer armor of interlinked outstanding rings, the plane of each ring extending transversely to the axis of the tire.

2. A vehicle tire having an outer armor composed of a multiplicity of series of interlinked metallic outstanding rings, the plane of each ring of each series extending transversely across the face of the tire, and the rings of each series being in contact with the rings of the next adjacent series on either side, and longitudinal wires extending around the tire, said wires passing on the inside of some of the rings and over the outside of the other rings, and being thereby interwoven therewith.

3. A vehicle tire having an outer armor composed of a multiplicity of series of interlinked metallic outstanding rings, the rings of each series extending transversely across the face of the tire and being in contact with the rings of the next adjacent series, and a plurality of strands extending longitudinally of the tire and each of said strands extending across the outer face of a plurality of rings and being at intervals depressed beneath one of said rings, thereby being interwoven with said rings.

4. A vehicle tire having an outer armor composed of a multiplicity of series of interlinked metallic outstanding rings, the rings of each series extending transversely across the face of the tire and being in contact with the rings of the next adjacent series and the rings of one series being in staggered relation to the rings of the next adjacent series, and a plurality of longitudinal wires extending around the tire and interwoven at intervals with the several series of rings.

5. In a vehicle tire, the combination with a pneumatic tire, of a lining of textile material adapted to surround the exterior of the pneumatic tire and having its margins provided with longitudinally extending annular strips, an outer armor composed of a plurality of series of interlinked metallic outstanding rings secured to the outer face of the inner lining and annular rods around which the inner margins of the metallic fabric formed by said rings are folded, thereby forming an annular enlargement on either side of the tire adapted to be engaged with the inwardly turned flanges of a clencher rim.

In testimony whereof we affix our signatures in presence of two witnesses.

ALEXANDER CROWE. [L. S.]
JOHN E. KINZEL. [L. S.]

Witnesses:
H. A. ERNST,
PETER E. BENCE.